(12) United States Patent
Clayton

(10) Patent No.: US 7,623,999 B2
(45) Date of Patent: Nov. 24, 2009

(54) PREDICTION METHOD

(75) Inventor: Gary A. Clayton, Derby (GB)

(73) Assignee: Rolls-Royce PLC, London (GB)

( * ) Notice: Subject to any disclaimer, the term of this patent is extended or adjusted under 35 U.S.C. 154(b) by 575 days.

(21) Appl. No.: 11/431,522

(22) Filed: May 11, 2006

(65) Prior Publication Data

US 2006/0280223 A1    Dec. 14, 2006

(30) Foreign Application Priority Data

Jun. 8, 2005    (GB) ................................ 0511639.7

(51) Int. Cl.
*G06F 7/60* (2006.01)
*G06F 17/10* (2006.01)

(52) U.S. Cl. .......................................................... 703/2
(58) Field of Classification Search ....................... 703/2
See application file for complete search history.

(56) References Cited

U.S. PATENT DOCUMENTS 5,926,399 A    7/1999  Berkooz et al.

7,079,996 B2 *  7/2006  Stewart et al. ................. 703/8
2004/0148940 A1 *  8/2004  Venkateswaran et al. ...... 60/772

FOREIGN PATENT DOCUMENTS

WO    WO 02/03309 A1    1/2002

OTHER PUBLICATIONS

Tiedo Tinga, Wim B. de Wolf, Wilfried P.J. Visser, Sandor Woldendorp, "Integrated Lifting Analysis of a Film-Cooled Blade", National Aerospace Laboratory, Oct. 8-11, 2001, 14 pages.*

* cited by examiner

*Primary Examiner*—Paul L Rodriguez
*Assistant Examiner*—Dwin M Craig
(74) *Attorney, Agent, or Firm*—Oliff & Berridge, PLC

(57) ABSTRACT

A method of predicting telemetry data for a system under analysis is provided, the method including the steps of: linking a computational fluid dynamics model and a finite element analysis model at a system condition; converging said computational fluid dynamics model and said finite element analysis model to obtain a converged solution; and extracting data from discrete locations in said converged solution to provide predicted telemetry data for said system condition. The predicted telemetry data is typically thermocouple data, thus providing virtual thermocouples for further analysis. A method of validating a system model using the predicted telemetry data is also provided.

13 Claims, 4 Drawing Sheets

CFD Runs 1) 1 For Each Flight Point/Speed
2) 25 Speeds Per Flight Cycle

Use Link Program To Combine CFD Runs And Metal Temperature Prediction Program

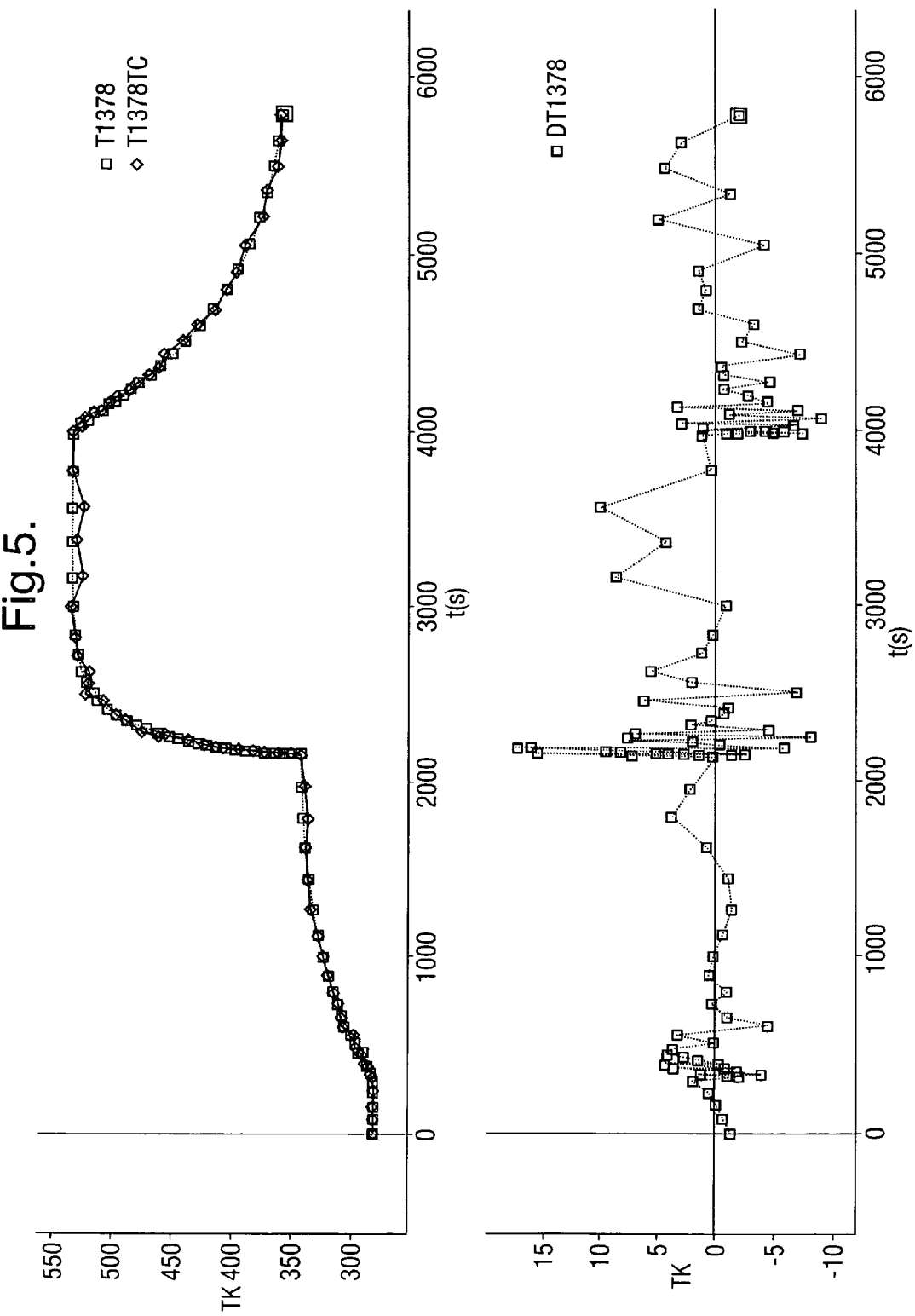

PREDICTION METHOD

BACKGROUND

1) Technical Field

The present invention relates to a prediction method. It is particularly, but not exclusively, concerned with a method of prediction which uses computational fluid dynamics, and more particularly to a method of prediction of telemetry data from systems such as gas turbine engines.

A number of methods are used to extract data, such as temperatures, flows, windage, heat flux, and heat transfer coefficients, from computational fluid dynamics (CFD) analysis of engine test measurements. This data can then be used in conventional finite element (FE) analysis, for example to derive thermal boundary conditions for metal temperature predictions.

2) Related Art

Two existing approaches to the derivation of thermal boundary conditions in engine testing are discussed with reference to FIGS. 1 and 2.

The first approach, illustrated in the flow-chart of FIG. 1, generally involves solving the fluid dynamics of the problem and then interpreting the data to provide a conventional heat transfer coefficient and fluid temperature to enter into the existing metal temperature prediction code.

This approach suffers from a number of problems, in particular that the local fluid temperature which is used to extract the heat transfer coefficient is open to interpretation, or where it is back-calculated from a prior knowledge of the heat transfer coefficient, an unrepresentative value may be obtained. The derived heat transfer coefficients can also differ depending on the precise detail of how have been extracted. The heat transfer coefficients are also extracted from steady state CFD solutions where temperature gradients within the fluid and between the fluid and the bounding solid are small, which can lead to inaccuracies or even impossibilities in extracting sensible data, for example due to variations in fluid temperature, away from the solid surface, being of similar magnitude to the difference between the solid wall and chosen fluid temperature from the heat transfer extraction.

In order to address some of the above problems, a second approach has been considered which links the CFD and the metal temperature prediction codes directly and passes data from one to the other until a solution is achieved. This is illustrated in FIG. 2.

This approach removes the need for the CFD data to be interpreted before applying the metal temperature prediction program/code. However, the approach is extremely time consuming to implement since a CFD solution is required for each specific rotational speed the component is spinning at, and only once these have been generated can the linking and running of the CFD solutions and metal temperature prediction code be carried out. Generally for one set of temperature predictions (e.g. a single flight cycle) there are of the order of 25 speeds to be considered and thus 25 CFD solutions required. Each such solution takes approximately one week to produce. These solutions then need to be linked to the metal temperature prediction program and run for the flight cycle. It takes approximately 36 hours to run a single transient, so running all 25 transients would take several weeks. In the course of an engine project the models would have to be run several times to cope with the different cycles required. Thus this method is impractical except in a research environment.

It is noted that the above considerations relate to 2-dimensional CFD solutions, although there may be a demand in the future for 3-dimensional solutions, which would further increase the complexity and/or time for these calculations.

SUMMARY

Therefore, at its most general, the present invention seeks to provide a method which allows the interpretation and simplification of CFD data into a form which can be easily and reliably used for component temperature predictions.

Preferably the methods of the present invention address some or all of the above mentioned problems with the existing methods.

One object of the present invention is to provide a method which allows CFD analyses and predictions to be used in the prediction of component temperatures. The present invention also preferably provides a method which removes the uncertainty of the CFD data extraction method and allows the accuracy of a component temperature prediction to be determined based on the accuracy of the CFD solution.

An aspect of the present invention provides a method of predicting telemetry data for a system under analysis, the method including the steps of:

linking a computational fluid dynamics model and a finite element analysis model at a system condition;

converging said computational fluid dynamics model and said finite element analysis model to obtain a converged solution; and extracting data from discrete locations in said converged solution to provide predicted telemetry data for said system condition.

The telemetry data may include temperature data. In particular the data may include predicted thermocouple data or "virtual thermocouples".

The predicted telemetry data may be extracted from the converged and linked CFD/FE solution, either from the finite element analysis model or from the computational fluid dynamics model or from both.

Where the telemetry data includes temperature data, the finite element analysis model may provide a metal temperature prediction, which the CFD solution does not. Conversely the CFD solution may provide the fluid temperatures which the finite element program does not. These two may then be linked to solve the fluid and metal temperatures and pass data between each part for a converged solution.

Typically such linking is accomplished by determining the heat flux at the boundary of each of the models and passing that data between the two models.

The transient metal temperature prediction at discrete points ("virtual thermocouples") can then be taken and a conventional finite element match to the data carried out in the same way as is currently done for actual thermocouple data.

Therefore preferably each pair of locations corresponds to a standard thermocouple location of the system, i.e. a location at which an actual thermocouple would be placed during system testing.

Thus the number of actual thermocouples that are used in a telemetry test can be reduced, resulting in reduced instrumentation requirements on development engines and cost savings. It is also possible to replace all thermocouples in a selected telemetry test with virtual thermocouples, in which case it may no longer be necessary to physically carry out the test.

The telemetry data may also include one or more of the following: stresses; strains and/or vibration data.

further aspect of the present invention provides a method of validating a system model including the steps of:

constructing a system model;

validating said system model using predicted telemetry data obtained from a method according to the above aspect.

Preferably the system model which is validated is a finite element model.

Preferably the system model is validated over one or more system cycles, each cycle including a plurality of system conditions. This can allow the model to have transient predictive capability for any engine cycle.

The method of this aspect may further include the step of validating said system model using measured telemetry data. This may allow the uncertainties in the predicted data to be determined.

The method according to this aspect of the invention may allow good quality models (particularly temperature and deflection prediction models) to be produced earlier in the design phase, which may remove the requirement for expensive redesign and in-service fleet roll-overs. The method can also result in reduced instrumentation requirements on development engines.

The system referred to in the above aspects may be an engine and in particular may be a gas turbine engine.

Further aspects of the present invention provide: computer-readable code for performing the method of any of the previous aspects; a computer program product carrying such computer-readable code; and a computer system configured to perform the method of any of the previous aspects.

A typical computer system of the present invention includes a central processing unit (CPU), input means, output means and data storage means (such as RAM or a disk drive). A monitor may be provided for display purposes.

The term "computer program product" includes any computer readable medium or media which can be read and accessed directly by a computer. Typical media include, but are not limited to: magnetic storage media such as floppy disks, hard disc storage medium and magnetic tape; optical storage media such as optical discs or CD-ROM; electrical storage media such as RAM and ROM; and hybrids of these categories such as magnetic/optical storage media.

For example, a computer system according to the invention may include a processor adapted to link a computational fluid dynamics solution and a finite element analysis model at a system condition; converge said solution and said model to obtain a converged solution; and extract data from discrete locations in said converged solution to provide predicted telemetry data for said system condition.

The computer system may further comprise data storage means for storing said converged solution. The same data storage means may store said computational fluid dynamics solution and/or said finite element analysis model. Alternatively further data storage means may be provided for either or both of these.

BRIEF DESCRIPTION OF THE DRAWINGS

Embodiments of the present invention will now be described in relation to the accompanying drawings, in which:

FIG. 5 illustrates the matching process carried out in one embodiment of the invention.

DETAILED DESCRIPTION OF EMBODIMENTS

Figure 3:
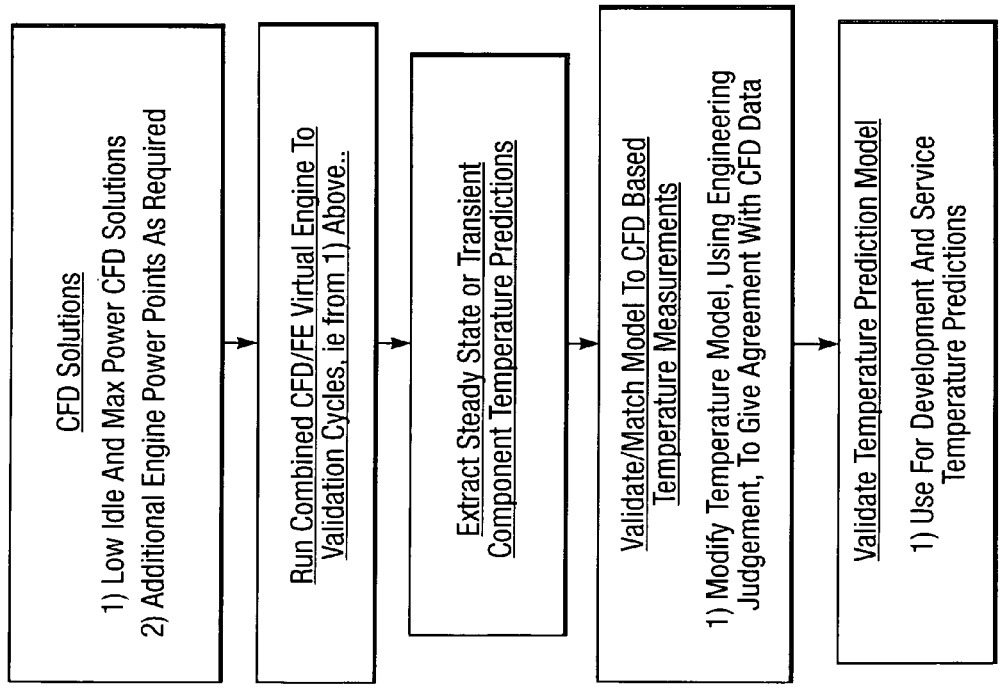
FIG. 3 is a flow chart illustrating a method according to an embodiment of the present invention.

FIG. 3 shows a method according to an embodiment of the invention which extracts heat transfer data from CFD computations for use in component temperature prediction codes and thus allows the prediction of temperature data.

Figure 2:
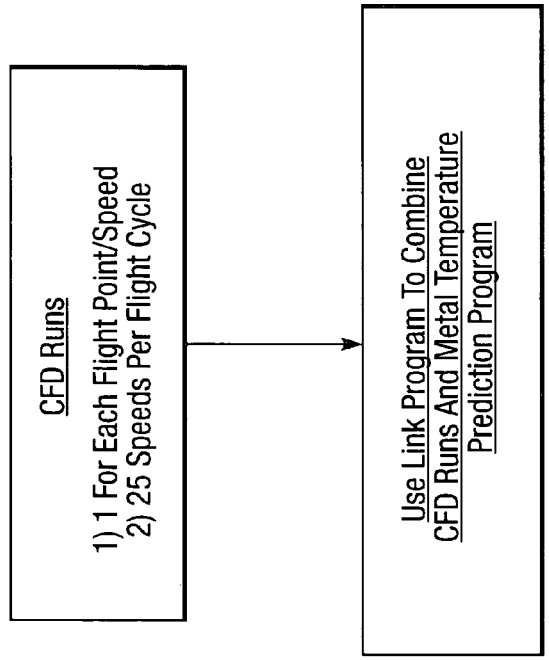
FIG. 2 is a flow chart illustrating another method of the prior art and has already been described.
Figure 1:
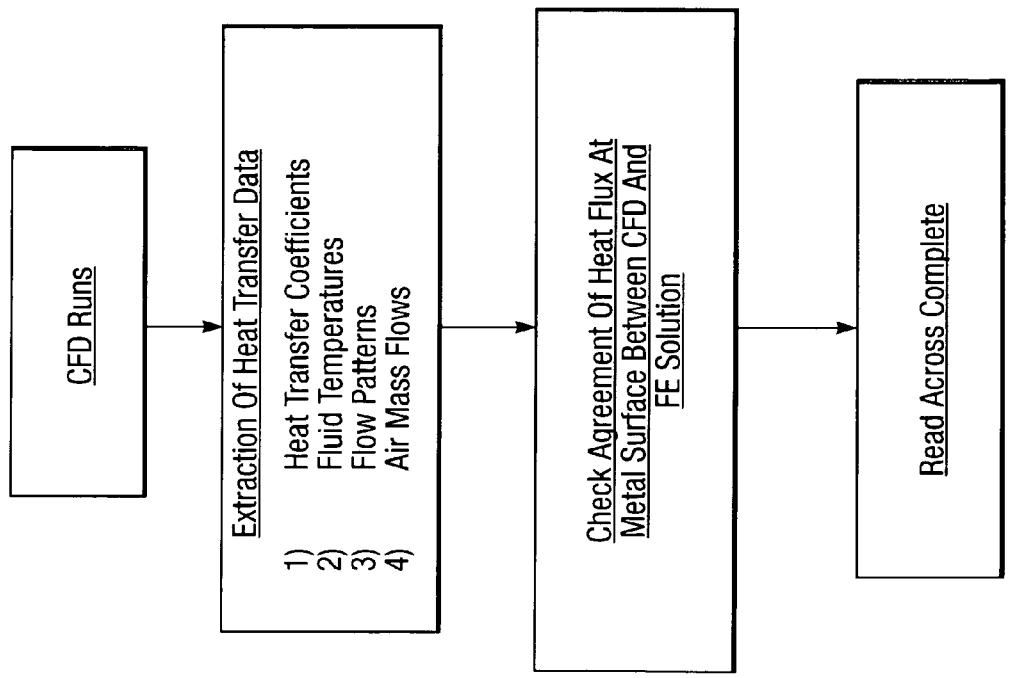
FIG. 1 is a flow chart illustrating a method of the prior art and has already been described.
Figure 4:
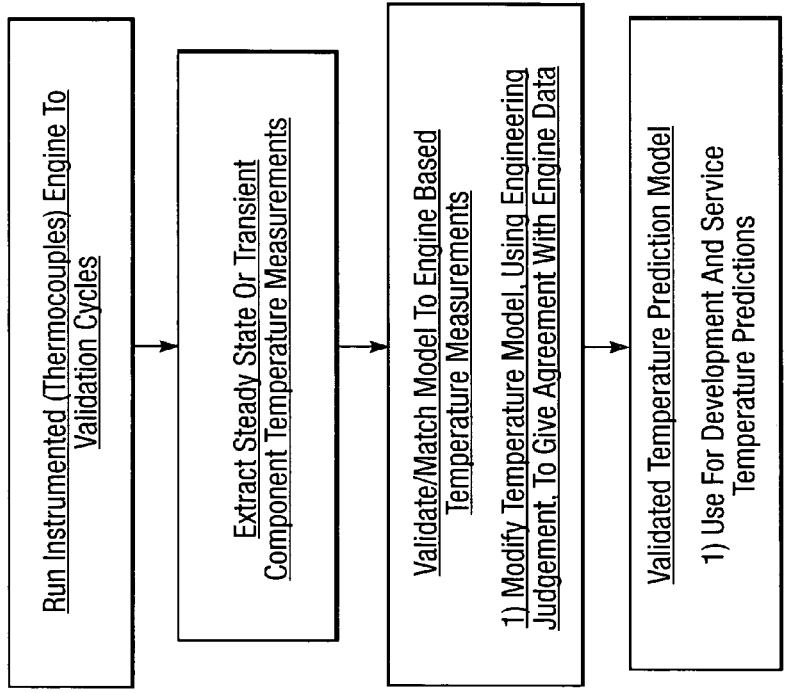
FIG. 4 is a flow chart illustrating a method of validating a temperature prediction model of the prior art.

This method provides the concepts of a "virtual engine test" and "virtual thermocouple" and uses the predicted transient metal temperature prediction in order to validate the metal temperature in the "stand alone" FE model. By analogy with the method shown in FIG. 4, a comparison can be drawn with the validation process by which components are validated against real engine data.

The method according to the embodiment illustrated in FIG. 3 involves the principal steps of:

1) Producing converged CFD runs for low idle and max conditions (plus other points as required, e.g. cruise or performance curve).

2) Linking the CFD solutions produced in step 1) with the metal temperature prediction code (e.g. a finite element prediction code) and running both codes to produce component transient temperature predictions.

3) Extracting transient temperatures from the results files at locations on the component where thermocouples would have placed on a physical engine test.

4) Using the temperature traces from those locations as "virtual thermocouple" readings and validating (or matching) the temperature prediction model.

5) The validated thermo-mechanical model can then be run to predict engine test bed or service behaviour.

Although any cycle could be used to produce the transient metal temperature traces, in order to limit the number of CFD computations made and also to provide similarity with conventional test cycles, a square cycle is preferred. In this cycle the engine is run to steady state at low idle, quickly accelerated to maximum power and stabilised there, then quickly decelerated back to low idle and stabilised again, thus having a power vs. time plot that resembles a square wave.

FIG. 5 shows part of the matching process graphically. The top graph shows actual thermocouple predictions from the engine test and those from the thermal model prediction overlaid. The lower figure shows the difference between these (i.e. the error in the prediction). This difference is minimised in the validation/matching step above. This process is replicated for the current thermocouple traces.

In comparison, in the existing method, engine thermocouple test data is compared to the thermal model prediction in the validating/matching step.

Whilst the method of the above embodiment is particularly applicable to components which are rotating, the method may also be applied to stationary components where the boundary conditions are changing with time.

A particular analysis strategy that incorporates an embodiment of the present invention is described below in relation to LPT (low pressure turbine) temperatures for a particular engine, and illustrated in the flow chart of FIG. 6.

The major steps in this strategy are as follows (the numbered steps below refer to the corresponding numbered boxes of the flow chart of FIG. 6):

1) Produce CFD solutions for low idle and max power situations in a test geometry.

2) Link the CFD solutions of 1) with FE solutions to provide virtual temperature predictions at thermocouple locations and geometry of a test engine.

Figure 6:
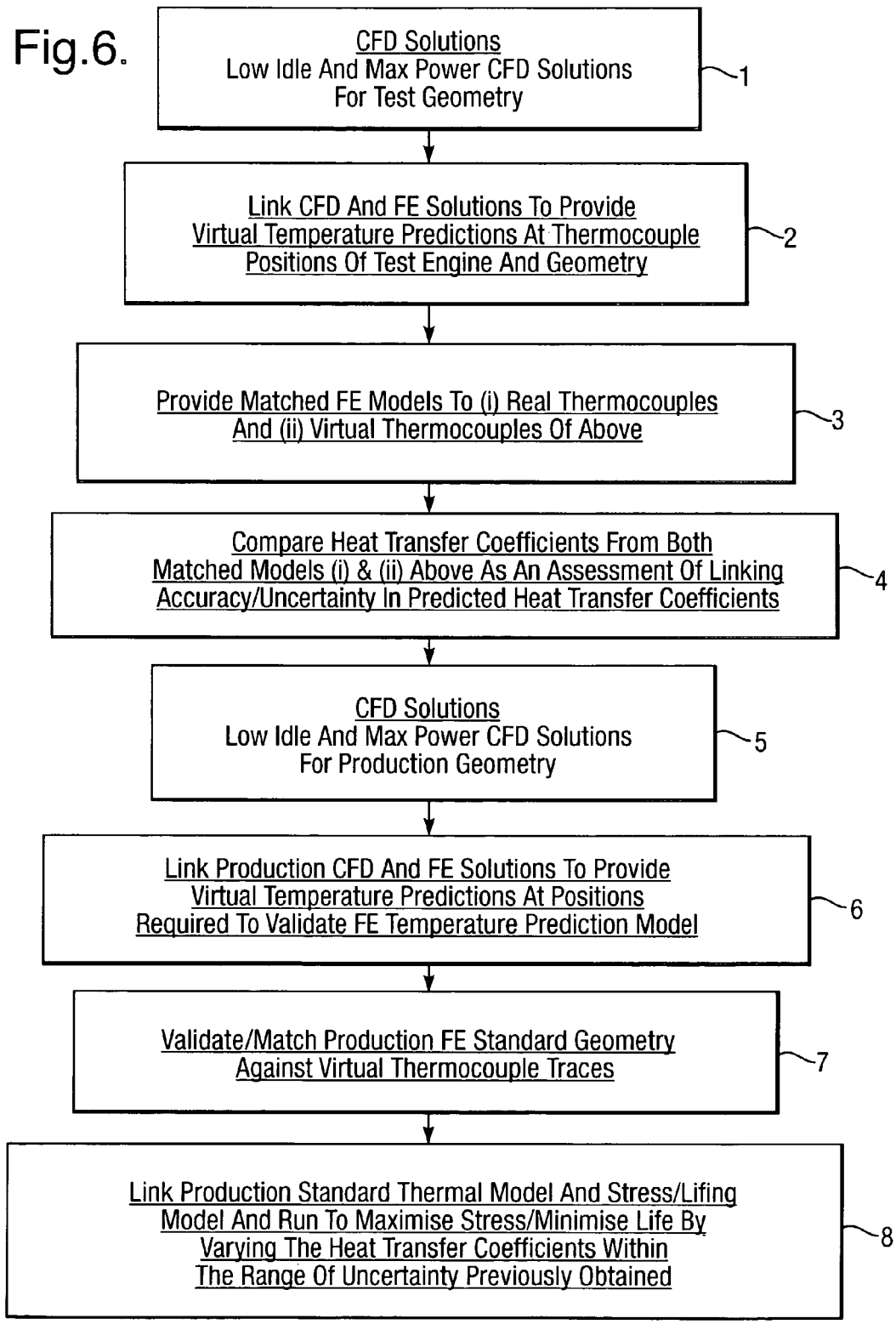
FIG. 6 is a flow chart illustrating another method according to an embodiment of the present invention.

3) Obtain test data from the engine and match to a Finite Element Analysis (FEA) model (step (i) in box 3 of FIG. 6).

Use the above FEA model but rematch to the virtual thermocouple prediction of 2) above (step (ii) in box 3 of FIG. 6).

4) Compare the heat transfer coefficient factors derived from both steps in 3) above to assess the accuracy of the CFD and of the extraction of heat transfer boundary conditions over specific areas of the model (discretisation) of the CFD to FEA cross-over. This variation provides a gauge as to the uncertainty in the heat transfer coefficients to be used for the production standard analysis.

5) Obtain CFD solutions at least low idle and max power for the production geometry.

6) Use the production standard FEA model and as in step 3) above, define the bore as a CFD cavity. Generate the transient temperature for a square cycle at positions where thermocouples would have been specified for a normal telemetry test (i.e. generate virtual thermocouples). This allows the FE temperature prediction model to be validated.

(The transient temperatures could be generated for more complex flight cycles, but this will become prohibitive in terms of time as a CFD solution will be required for each phase of the flight.)

7) Use the FEA model in the conventional way, i.e. using streams with specified mass flows and heat transfer coefficients, and match the FEA model to the virtual thermocouple traces.

8) Link the thermal and stress FEA models and run to maximise stress/minimise life by varying the thermal boundary conditions within the predetermined range provided by the uncertainty obtained in 3) above. This uses the FEA model of 7) and the uncertainty in the CFD derived heat transfer coefficients from 3) to provide predictions of the temperatures and of the worst stresses at the main lifting positions.

In this method the step of recasting the CFD into the original FEA model (step 4) above) is not strictly necessary. However, this step enables a sensitivity study to be carried out on the CFD derived boundary conditions in terms of the resultant temperatures and stresses (i.e. step 8). This recognises the inaccuracy of any predictive tool and thus the requirement to bound any uncertainty.

Although the above method is described for an existing engine set-up, the methods of the present invention are generic and can be used at any stage in the design and verification process.

In particular, the methods may be of significant benefit for new designs. By using the "virtual telemetry test" and producing "virtual thermocouple" measurements, a conventional FEA matching exercise can be carried out to produce a better quality model earlier in the design phase. As the "virtual thermocouple" positions can be chosen to be those positions where actual thermocouples would be placed on a standard engine test, any subsequent engine telemetry test would be relatively easy to validate.

I claim:

1. A computer-implemented method of predicting temperature data for a system under analysis, the method comprising:
    linking a computational fluid dynamics model and a finite element analysis model at a system condition;
    converging said computational fluid dynamics model concurrently with said finite element analysis model to obtain a converged solution with a computer; and
    extracting data from discrete locations in said converged solution to provide predicted temperature data for said system condition.

2. The computer-implemented method according to claim 1 wherein the data includes predicted thermocouple data.

3. The computer-implemented method according to claim 2 wherein each location corresponds to a standard thermocouple measurement location of the system.

4. The computer-implemented method according to claim 2 wherein the predicted thermocouple data is virtual thermocouple data.

5. The computer-implemented method according to claim 1 wherein the system is an engine.

6. The computer-implemented method according to claim 5 wherein the engine is a gas turbine engine.

7. The computer-implemented method according to claim 1 wherein the linking a computational fluid dynamics model and a finite element analysis model comprises passing heat flux data to the finite element analysis model.

8. The computer-implemented method according to claim 1 wherein the linking a computational fluid dynamics model and a finite element analysis model comprises passing heat flux data to the computational fluid dynamics model.

9. A computer-implemented method of validating a system model, the method comprising:
    constructing a system model;
    validating said system model using predicted temperature data obtained from the method according to claim 1.

10. The computer-implemented method according to claim 9 wherein said system model is a finite element model.

11. The computer-implemented method according to claim 9 wherein said system model is validated over one or more system cycles.

12. The computer-implemented method according to claim 9 further including validating said system model using measured temperature data.

13. The computer-implemented method according to claim 10 wherein said system model is validated over one or more system cycles.

* * * * *